United States Patent
Li

(10) Patent No.: US 8,224,186 B2
(45) Date of Patent: Jul. 17, 2012

(54) TRANSMISSION MODULE AND ELECTRONIC SYSTEM UTILIZING THE SAME

(75) Inventor: Ming-Feng Li, Taipei County (TW)

(73) Assignee: MSI Computer (Shenzhen) Co., Ltd., Shenzhen (CN)

( * ) Notice: Subject to any disclaimer, the term of this patent is extended or adjusted under 35 U.S.C. 154(b) by 286 days.

(21) Appl. No.: 12/628,588

(22) Filed: Dec. 1, 2009

(65) Prior Publication Data

US 2011/0058816 A1    Mar. 10, 2011

(30) Foreign Application Priority Data

Sep. 7, 2009  (TW) ................................ 98130043 A

(51) Int. Cl.
  *H04B 10/00*  (2006.01)
(52) U.S. Cl. ........ 398/130; 398/201; 398/128; 398/140; 398/118; 250/505.1; 250/515.1
(58) Field of Classification Search .................. 398/130, 398/118, 140, 201, 128, 182, 135; 250/505.1, 250/515.1, 506.1
See application file for complete search history.

(56) References Cited

U.S. PATENT DOCUMENTS

| | | | | |
|---|---|---|---|---|
| 6,978,093 | B2 * | 12/2005 | Clark | 398/124 |
| 7,706,848 | B2 * | 4/2010 | Won | 455/575.1 |
| 7,873,279 | B2 * | 1/2011 | Alameh et al. | 398/114 |
| 8,135,281 | B2 * | 3/2012 | Zhovnirovsky et al. | 398/128 |
| 2004/0036887 | A1 * | 2/2004 | Kitahara | 356/486 |
| 2004/0042798 | A1 * | 3/2004 | Kehr et al. | 398/135 |
| 2008/0266567 | A1 * | 10/2008 | Skorobogatiy et al. | 356/445 |
| 2009/0046272 | A1 * | 2/2009 | Ohishi et al. | 356/5.01 |
| 2009/0279177 | A1 * | 11/2009 | Chang et al. | 359/603 |
| 2010/0124159 | A1 * | 5/2010 | Nakamura et al. | 369/112.23 |
| 2011/0116265 | A1 * | 5/2011 | Salm | 362/247 |
| 2011/0150493 | A1 * | 6/2011 | Nakaso et al. | 398/130 |

* cited by examiner

*Primary Examiner* — Li Liu
*Assistant Examiner* — Hibret Woldekidan
(74) *Attorney, Agent, or Firm* — Birch, Stewart, Kolasch & Birch, LLP

(57) ABSTRACT

A transmission module including an emitter device, a first reflection device, and a second reflection device is disclosed. The emitter device emits a light. The first reflection device reflects the light to generate a first reflected light. The second reflection device reflects the light to generate a second reflected light. The energy of the first reflected light is different from the energy of the second reflected light.

11 Claims, 6 Drawing Sheets

TRANSMISSION MODULE AND ELECTRONIC SYSTEM UTILIZING THE SAME

CROSS REFERENCE TO RELATED APPLICATIONS

This Application claims priority of Taiwan Patent Application No. 98130043, filed on Sep. 7, 2009, the entirety of which is incorporated by reference herein.

BACKGROUND OF THE INVENTION

1. Field of the Invention

The invention relates to a transmission module, and more particularly to a transmission module having a wireless communication function.

2. Description of the Related Art

In recent year, communications technology has been applied to various fields such as network gaming or network phones. Conventional transmission wires, used to transmit data, comprise coaxial cables, twisted-pair wires and optical fibers.

Coaxial cables generally transmit image, data or video. However, coaxial cables are relatively expensive. Twisted-pair wires generally serve as telephone wires. However, transmitting speed thereof is slow, and transmitted information thereby is easily affected by noise. Optical fibers generally transmit information fast, and transmitted information thereby is not easily affected by noise. However, installation of optical fibers is relatively expensive, and relatively more complex.

BRIEF SUMMARY OF THE INVENTION

Transmission modules are provided. An exemplary embodiment of a transmission module comprises an emitter device, a first reflection device, and a second reflection device. The emitter device emits a light. The first reflection device reflects the light to generate a first reflected light. The second reflection device reflects the light to generate a second reflected light. The energy of the first reflected light is different from the energy of the second reflected light.

Another exemplary embodiment of a transmission module comprises a first control device, a second control device, a first reflection device, and a second reflection device. The first control device emits a first light or receives a first reflected light. The second control device emits a second light when the first control device emits the first light. The second control device receives a second reflected light when the first control device receives the first reflected light. The first reflection device is disposed opposing the first control device and has a first scope of mapping. The first scope covers the first control device. The second reflection device is disposed opposing the second control device and has a second scope of mapping. The second first scope covers the second control device.

Electronic systems are also provided. An exemplary embodiment of an electronic system comprises an emitting module and a receiving module. The emitting module comprises an emitter device, a first reflection device, and a second reflection device. The emitter device emits a light. The first reflection device reflects the light to generate a first reflected light. The second reflection device reflects the light to generate a second reflected light. The energy of the first reflected light is different from the energy of the second reflected light. The receiving module receives and processes the first and the second reflected lights to obtain the position of the emitting module.

Another exemplary embodiment of an electronic system comprises a first control device, a second control device, a first reflection device, a second reflection device, and a third control device. The first control device emits a first light or receives a first reflected light. The second control device emits a second light when the first control device emits the first light and receives a second reflected light when the first control device receives the first reflected light. The first reflection device is disposed opposing the first control device and has a first scope of mapping. The first scope covers the first control device. The second reflection device is disposed opposing the second control device and has a second scope of mapping. The second first scope covers the second control device. The third control device receives a light when the first control device emits the first light and emits a light when the first control device receives the first reflected light.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
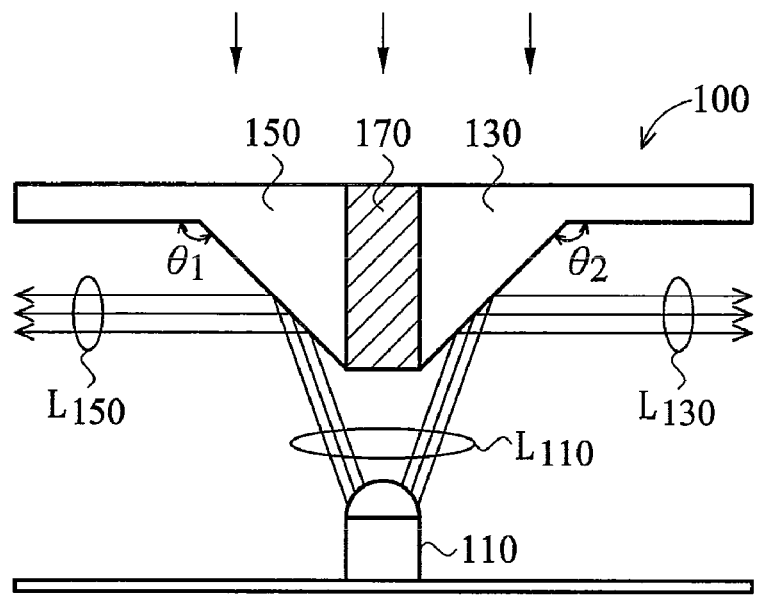
FIG. 1A is a schematic diagram of an exemplary embodiment of a transmission module of the invention.

FIG. 1A is a schematic diagram of an exemplary embodiment of a transmission module of the invention. The transmission module 100 comprises an emitter device 110, and reflection devices 130 and 150. The emitter device 110 emits a light $L_{110}$. The reflection devices 130 and 150 are disposed opposing the emitter device 110 to reflect the light $L_{110}$. In this embodiment, the reflection device 130 reflects the light $L_{110}$ to generate a reflected light $L_{130}$. The reflection device 150 reflects the light to $L_{150}$ generate a reflected light $L_{150}$. The energy of the reflected light $L_{150}$ is different from the energy of the reflected light $L_{130}$.

The energy of the reflected light $L_{150}$ is different from the energy of the reflected light $L_{130}$ by controlling the materials, the reflectivity or the reflection areas of the reflection devices 130 and 150. Additionally, the reflection device 130 comprises a radian θ1 and the reflection device 150 comprises a radian θ2. The energy of the reflected light $L_{150}$ is different from the energy of the reflected light $L_{130}$ by controlling the radians θ1 and θ2.

The invention does not limit the kind of the reflection devices 130 and 150 utilized. In some embodiments, one of the reflection devices 130 and 150 is a mirror or a light guiding plate. The invention does not limit the kind of the emitter device 110 utilized. In this embodiment, the light $L_{110}$ emitted by the emitter device 110 is an infrared ray or a laser beam.

Figure 1B:
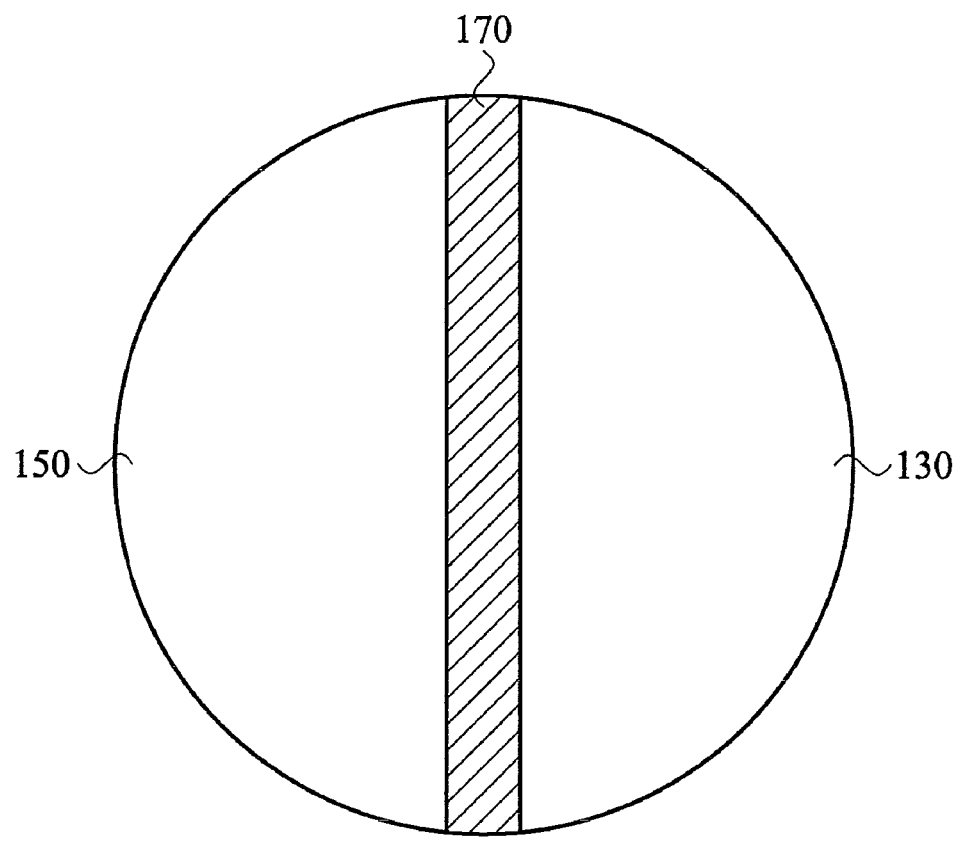
FIG. 1B is a top-view of exemplary embodiments of the reflection devices.

FIG. 1B is a top-view of exemplary embodiments of the reflection devices 130 and 150. The reflection devices 130 and 150 approximately constitute a circular shape. In this embodiment, an isolation device 170 is disposed between the reflection devices 130 and 150 such that the reflection device 130 is disposed on an independent plane and the reflection device 150 is disposed on another independent plane.

In one embodiment, the isolation device 170 is a gap to separate the reflection devices 130 and 150. The isolation device 170 is not necessary and may be optionally removed in other embodiments.

Figure 3A:
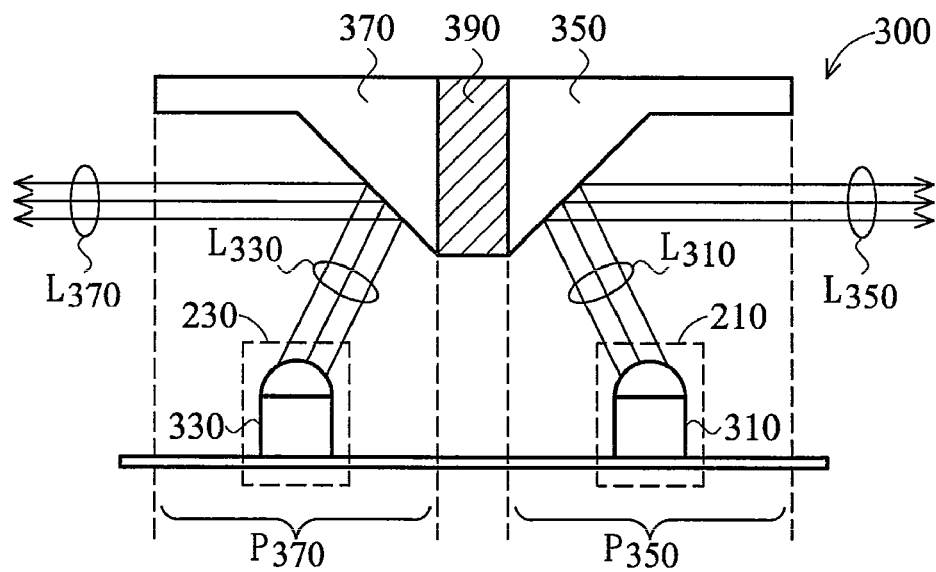
FIG. 3A is a schematic diagram of another exemplary embodiment of a transmission module of the invention.
Figure 3B:
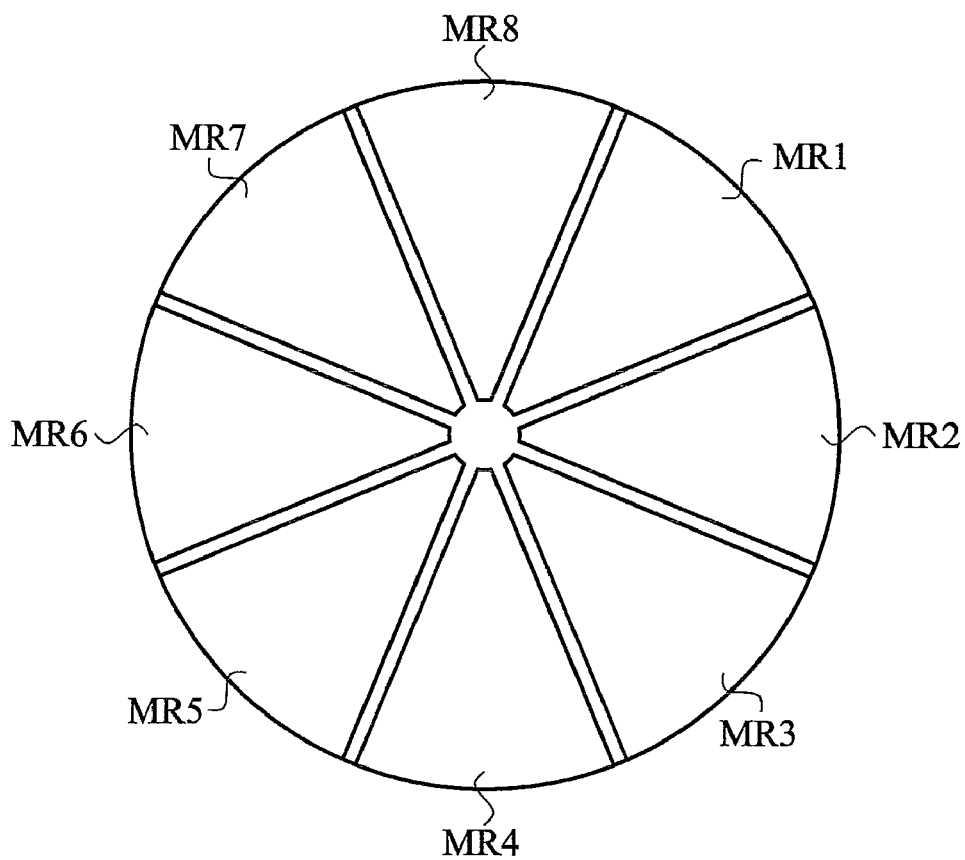
FIG. 3B is a top-view of exemplary embodiments of various reflection devices.

Further, the invention does not limit the number of reflection devices utilized. In this embodiment, the transmission device 100 comprises two reflection devices. In other embodiments, the transmission device 100 comprises at least three reflection devices, as shown in FIG. 3B. FIG. 3B shows various reflection devices MR1~MR8. When the number of the reflection devices is increased, the number of the reflected lights comprising different energies is also increased.

Each reflected light is capable of having particular energy by controlling the materials, the reflectivity, the reflection areas, or the radians of the reflection devices. When an external receiver receives the reflected lights emitted by the transmission module 100, the external receiver obtains the position of the transmission module 100 according to the energy of the reflected lights.

Figure 1C:
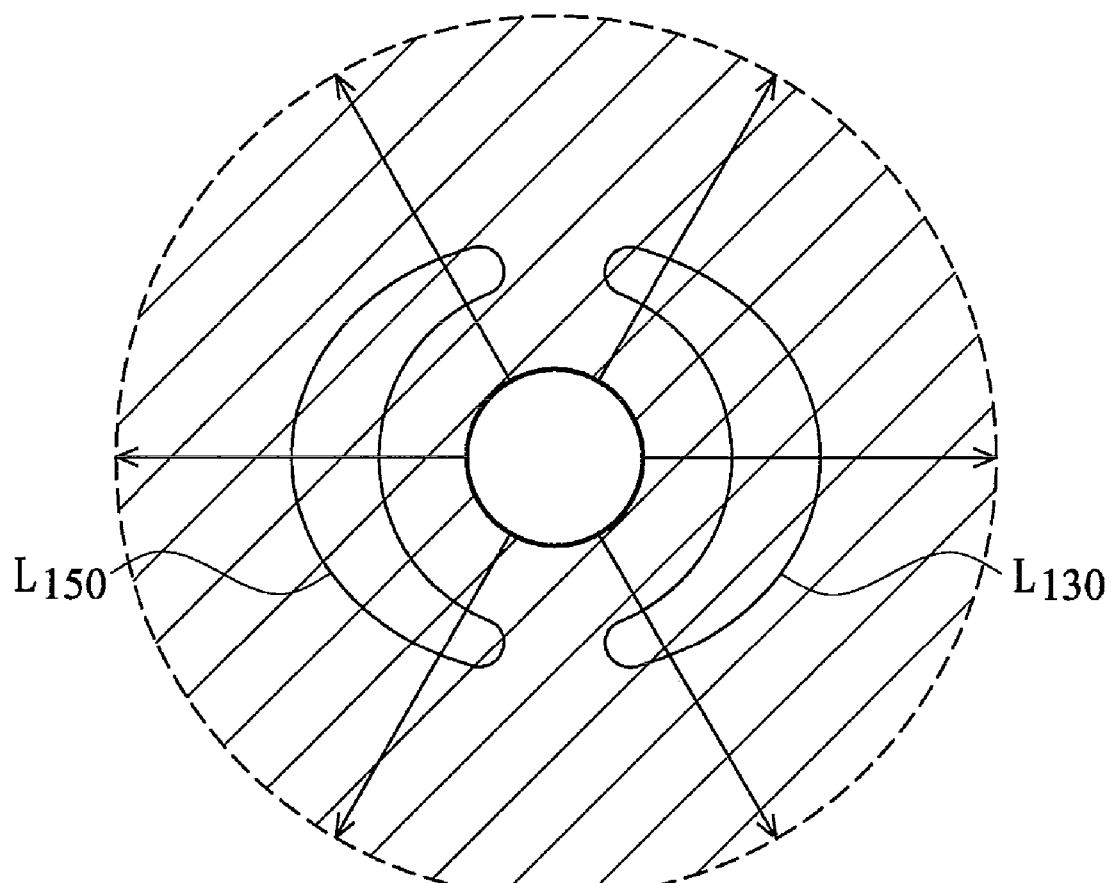
FIG. 1C is a schematic diagram of an exemplary embodiment of the reflected lights.

FIG. 1C is a schematic diagram of an exemplary embodiment of the reflected lights $L_{130}$ and $L_{150}$. Each of the reflected lights $L_{130}$ and $L_{150}$ is a radioactive ray. The radioactive scopes of the reflected lights $L_{130}$ and $L_{150}$ constitute a circular light. The oblique lines of FIG. 1C shows the circular light. Thus, an external receiver easily receives the reflected lights $L_{130}$ and $L_{150}$ emitted by the transmission module 100.

Figure 2:
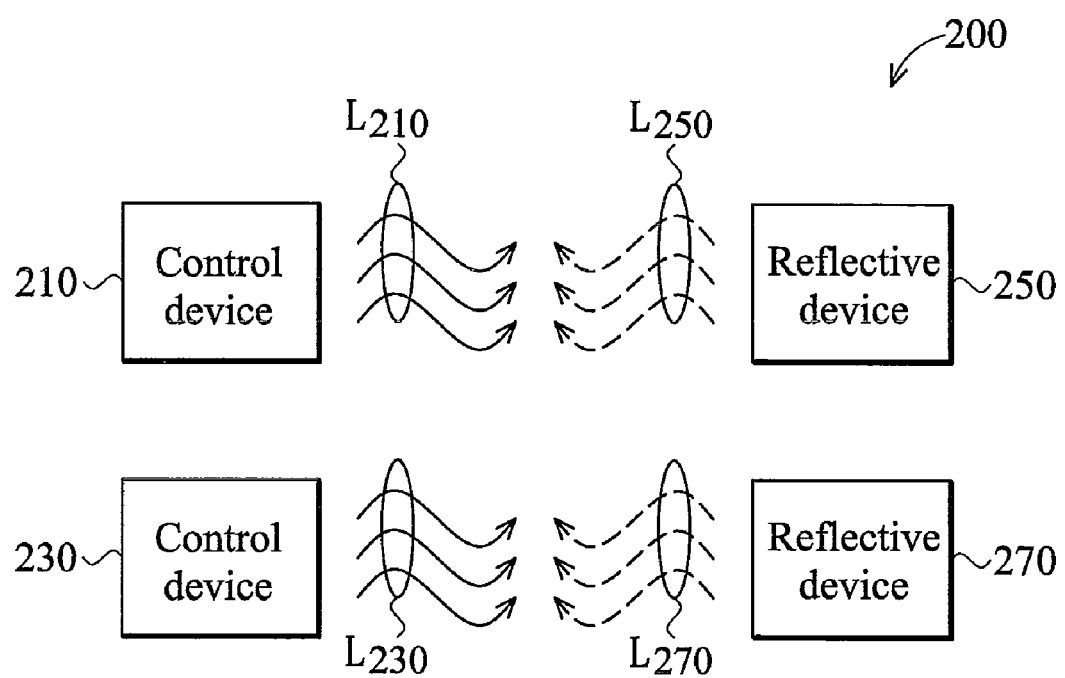
FIG. 2 is a schematic diagram of another exemplary embodiment of a transmission module of the invention.

FIG. 2 is a schematic diagram of another exemplary embodiment of a transmission module of the invention. The transmission module 200 comprises control devices 210, 230 and reflection devices 250, 270. The functions of the control devices 210 and 230 are the same. The invention does not limit the function of the control devices 210 and 230. In one embodiment, the control devices 210 and 230 have functions of emitting light. For example, when the control device 210 emits a first light, the control device 210 emits a second light. In another embodiment, the control devices 210 and 230 have functions of receiving light. For example, when the control device 210 receives a first reflected light, the control device 210 receives a second reflected light. The operating configurations of the control devices 210 and 230 and the reflection device 250 and 270 are described in greater detail in the following paragraphs.

In this embodiment, the reflection device 250 is disposed opposing the control device 210. Referring to FIG. 3A, the scope $P_{250}$ of mapping of the reflection device 250 covers the control device 210. As shown in FIG. 2, the reflection device 250 is capable of reflecting the light $L_{210}$ emitted from the control device 210 or transmitting the reflected light $L_{250}$ to the control device 210. In this embodiment, the scope $P_{350}$ of mapping of the reflection device 250 only covers the control device 210. Thus, the reflection device 250 does not reflect the light $L_{230}$ or transmit the reflected light $L_{250}$ to the control device 230.

The reflection device 270 is disposed opposing the control device 230. As shown in FIG. 3A, the scope $P_{370}$ of mapping of the reflection device 270 covers the control device 230. Referring to FIG. 2, the reflection device 270 is capable of reflecting the light $L_{230}$ emitted from the control device 230 or transmitting the reflected light $L_{270}$ to the control device 230. In this embodiment, the reflection device 270 does not reflect the light $L_{210}$ or transmit the reflected light $L_{270}$ to the control device 210. The reflection device 250 or 270 is a mirror or a light guiding plate.

FIG. 3A is a schematic diagram of another exemplary embodiment of a transmission module of the invention. In this embodiment, the control device 210 is an emitter 310 and the control device 230 is an emitter 330. The emitter 310 emits the light $L_{310}$ and the emitter 330 emits the light $L_{330}$. The code of the light $L_{310}$ is different from the code of the light $L_{330}$. The reflection device 350 reflects the light $L_{310}$ and the reflection device 370 reflects the light $L_{330}$. Additionally, the control device 210 is disposed within the scope $P_{350}$ of mapping of the reflection device 350 and the control device 230 is disposed within the scope $P_{370}$ of mapping of the reflection device 370.

The emitter 310 emits the light $L_{310}$ according to a first emitting frequency and the emitter 330 emits the light $L_{330}$ according to a second emitting frequency. Thus, the code of the light $L_{310}$ can be different from the code of the light $L_{330}$ by controlling the first and the second emitting frequency. For example, when the emitter 310 emits the light $L_{310}$ according to a first emitting frequency, the light $L_{310}$ may comprise the code 0. When the emitter 330 emits the light $L_{330}$ according to a second emitting frequency, the light $L_{330}$ may comprise the code 1.

Because the code of the light $L_{310}$ is different from the code of the light $L_{330}$, the code of the reflected light $L_{350}$ is different from the code of the reflected light $L_{370}$. Thus, an external receiver is capable of obtaining the position of the transmission module 300 according to the codes of the reflected lights $L_{350}$ and $L_{370}$ when the external receiver receives the reflected lights $L_{350}$ and $L_{370}$.

Additionally, when the external receiver approaches the transmission module 300, the external receiver can receive strong reflected lights. When the external receiver leaves the transmission module 300, the reflected lights received by the external receiver are weak. Thus, the external receiver obtains the distance between the transmission module 300 and the external receiver according to intensity of the received reflected lights.

As shown in FIG. 3A, an isolation device 390 is disposed between the reflection devices 350 and 370. The isolation device 390 prevents the light $L_{330}$ from affecting the reflected light $L_{350}$ and prevents the light $L_{310}$ from affecting the reflected light $L_{370}$. The reflection devices 350 and 370 are independently disposed on the different planes due to isolation device 390. In other words, the reflection device 350 does not contact with the reflection device 370. In other embodiments, the reflection device 350 may contact with the reflection device 370. In such a case, the isolation device 390 (such as a partition) is utilized to obtain different reflection regions.

In this embodiment, the transmission module 300 comprises two control devices and two reflection devices, but the disclosure is not limited thereto. In some embodiments, the number of control devices and the reflection devices are more than two, wherein the number of the control devices is equal to the number of the reflection devices.

FIG. 3B is a top-view of exemplary embodiments of various reflection devices of the invention. The reflection devices MR1~MR8 are arranged in a circular shape. The reflection devices MR1~MR8 are independently disposed on different planes. Thus, the reflection devices MR1~MR8 are not in contact with each other.

For example, the reflection device MR1 does not contact with the reflection devices MR2~MR8. Similarly, the reflection device MR8 does not contact with the reflection devices MR1~MR7. In other embodiments, the reflection devices MR1~MR8 contact with each other, but a partition is disposed between neighboring reflection devices to obtain different reflection regions.

Figure 3C:
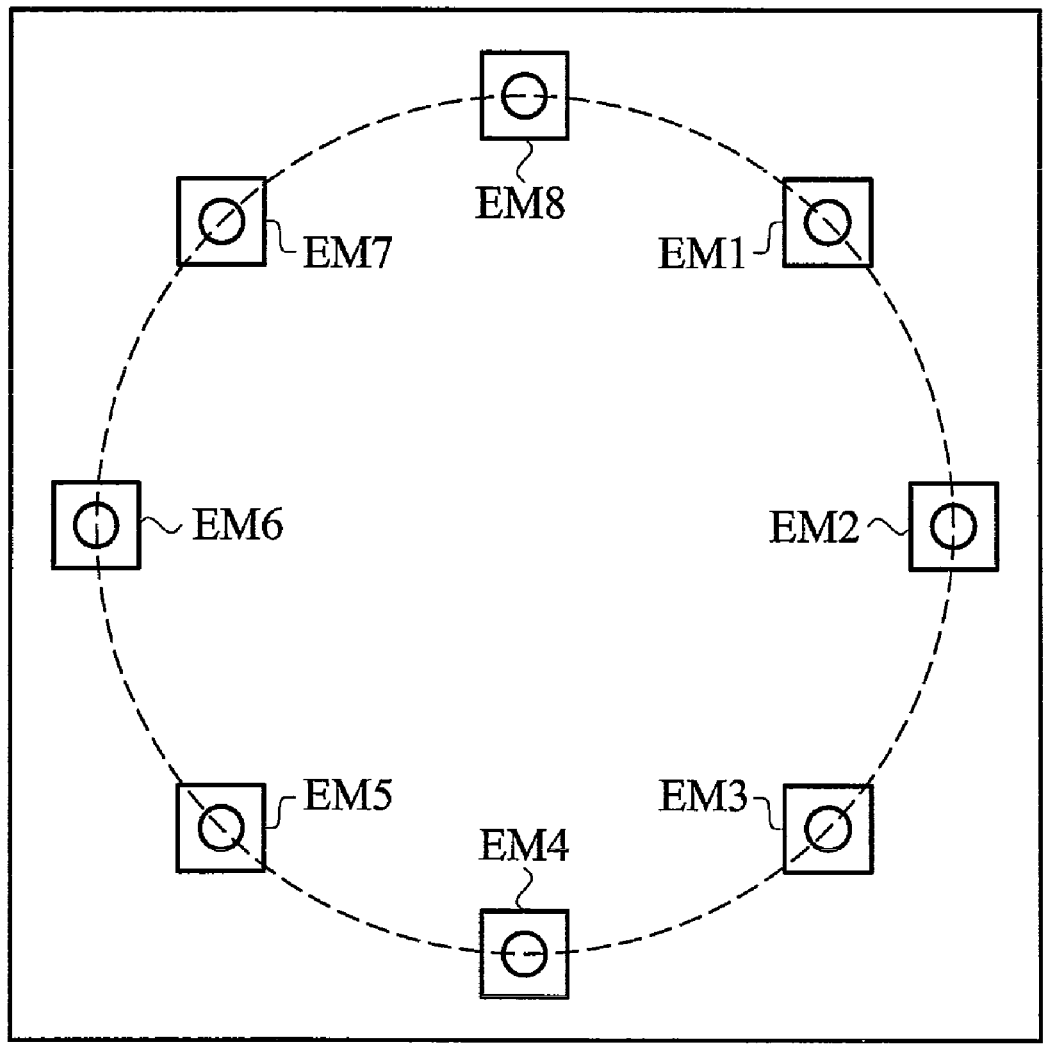
FIG. 3C is a top-view of exemplary embodiments of various control devices.

Each reflection region corresponds to one control device. Thus, the control devices can be arranged as shown in FIG. 3C when the reflection devices are arranged as shown in FIG. 3B. Referring to FIG. 3C, the control devices EM1~EM8 are arranged according to a circular shape. Each control device is disposed within the scope of mapping of the corresponding reflection device.

In this embodiment, the codes of the lights emitted by the control devices EM1~EM8 are different. Further, the lights emitted by the control devices EM1~EM8 are radioactive rays and the radioactive scopes of the lights form a circular light similar to FIG. 1C.

Figure 4:
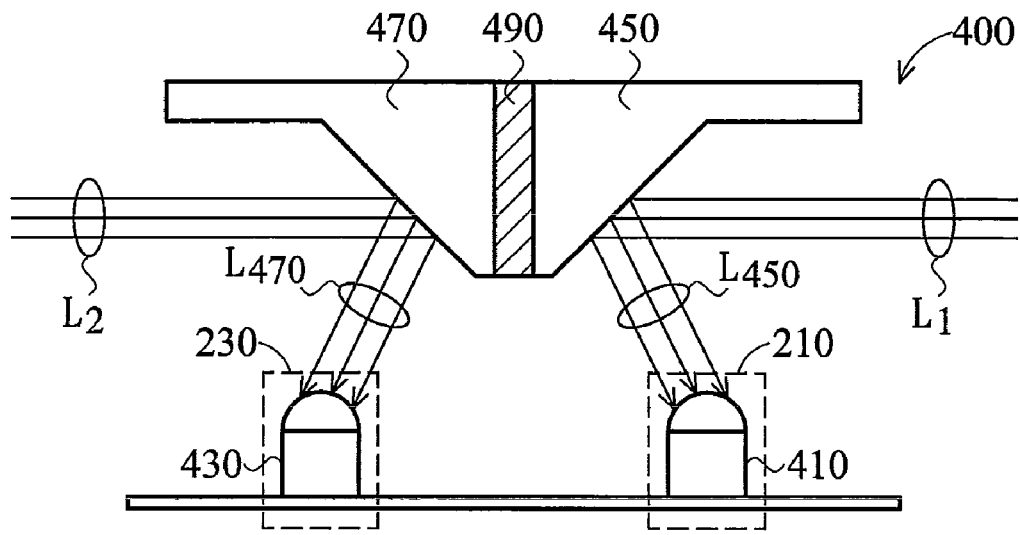
FIG. 4 is a schematic diagram of another exemplary embodiment of a transmission module.

FIG. 4 is a schematic diagram of another exemplary embodiment of a transmission module. In this embodiment, the control device 210 is the receiver 410 and the control device 230 is the receiver 430. The reflection device 450 reflects an external light $L_1$ and generates a reflected light $L_{450}$ to the receiver 410. The reflection device 470 reflects an external light $L_2$ and generates a reflected light $L_{470}$ to the receiver 430.

In one embodiment, the lights $L_1$ and $L_2$ are emitted by an external emitter. Since the external emitter may be disposed in different positions, one reflection device (450 or 470) may receive an external light ($L_1$ or $L_2$). When the corresponding receiver (410 or 430) receives the corresponding reflected light ($L_{450}$ or $L_{470}$), the location of the external emitter can be obtained.

In another embodiment, the reflection device 450 receives the external light $L_1$, and simultaneously, the reflection device 470 receives the external light $L_2$. In this case, the energy or the codes of the external lights $L_1$ and $L_2$ may be different. In one embodiment, the external lights $L_1$ and $L_2$ may be the reflected light $L_{350}$ and $L_{370}$. Thus, the receivers 410 and 430 obtain the position of an external emitter according to the energy or the codes of the received reflected lights $L_{450}$ and $L_{470}$ when the reflection devices 450 and 470 reflect the external lights $L_1$ and $L_2$ emitted by the external emitter. Furthermore, the distance between the external emitter and the transmission module 400 can be obtained according to the energy or the codes of the received reflected lights $L_{450}$ and $L_{470}$.

To sufficiently reflect the external lights $L_1$ and $L_2$ to the receivers 410 and 430, the material, the reflectivity, the reflection area, or the radian of the reflection device 450 is the same as that of the reflection device 470. Additionally, an isolation device 490 is disposed between the reflection devices 450 and 470 to prevent the reflection device 450 from receiving the external light $L_2$ and to prevent the reflection device 470 from receiving the external light $L_1$.

Figure 5:
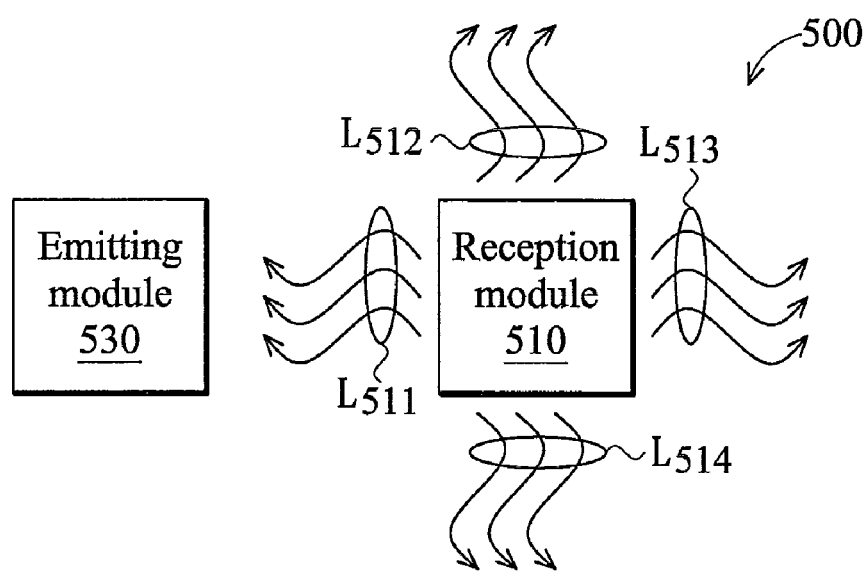
FIG. 5 is a schematic diagram of another exemplary embodiment of an electronic system.

FIG. 5 is a schematic diagram of another exemplary embodiment of an electronic system of the invention. The electronic system 500 comprises an emitting module 510 and a receiving module 530. The emitting module 510 and the receiving module 530 utilize a wireless method to communicate with each other. In this embodiment, the emitting module 510 emits lights $L_{511}$~$L_{514}$. The receiving module 530 receives the lights $L_{511}$~$L_{514}$ and obtains the position of the emitting module 510 according to the receiving result.

In this embodiment, the lights $L_{511}$~$L_{514}$ are radioactive rays and the radioactive scopes of the lights $L_{511}$~$L_{514}$ constitute a circular light. In one embodiment, the position of the emitting module 510 is fixed. The position of the receiving module 530 is actively changed or inactively changed by a user.

The receiving module 530 obtains the position of the emitting module 510 according to the received lights. For example, when the receiving module 530 receives the light $L_{511}$, the receiving module 530 determines that the emitting module 510 is located at the right side of the receiving module 530. Additionally, the receiving module 530 obtains the distance between the emitting module 510 and the receiving module 530 according to intensity of the received lights.

In one embodiment, the emitting module 510 may be the transmission module 100 or 300 shown in FIG. 1A or 3A. In this case, the receiving module 530 is the transmission module 400 shown in FIG. 4, but the disclosure is not limited thereto. In some embodiments, other receivers can serve as the receiving module 530 when the emitting module 510 is the transmission module 100 or 300.

In another embodiment, the receiving module 530 is the transmission module 400 shown in FIG. 4. In this case, the emitting module 510 can be the general light emitter. Since the transmission module 400 comprises the receivers 410, 430 and the reflection devices 450 and 470, the position of the emitting module 510 can be obtained according to the received result of the receivers 410 and 430.

When the transmission module comprises various reflection devices and a single emitter device as shown in FIG. 1A or comprises various reflection devices and various emitter devices as shown in FIG. 3A, various lights having different energy or having different codes are reflected. One external receiver obtains the position of the transmission module according to the reflected lights generated by the reflection devices.

Additionally, when the transmission module comprises various reflection devices and various receivers as shown in FIG. 4, the position of an external emitter or the distance of the external emitter and the transmission module can be determined according to the received result of each receiver.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transmission module, comprising:
 a first control device emitting a first light or receiving a first reflected light;
 a second control device emitting a second light when the first control device emits the first light and receiving a second reflected light when the first control device receives the first reflected light;
 a first reflection device disposed opposing the first control device and having a first scope of mapping, wherein the first scope covers the first control device; and a second reflection device disposed opposing the second control device and having a second scope of mapping, wherein the second first scope covers the second control device, wherein when the first control device emits the first light, the first reflection device reflects the first light to generate a third light, and when the second control device emits the second light, the second reflection device reflects the second light to generate a fourth light, and wherein the transmission module further comprises an isolation device disposed between the first and the second reflection devices to prevent the second light from being affected by the third light and prevent the first light from being affected by the fourth light.

2. The transmission module as claimed in claim 1, wherein the energy of the first light is different from the second light.

3. The transmission module as claimed in claim 1, wherein one of the third and the fourth lights is a radioactive ray and the scope of the third light and the scope of the fourth light form a circular light.

4. The transmission module as claimed in claim 1, wherein the first reflection device is disposed on a first plane and the second reflection device is disposed on a second plane independent of the first plane.

5. The transmission module as claimed in claim 1, wherein when the first reflection device reflects a first external light to generate the first reflected light, the first control device receives the first reflected light, and when the second reflection device reflects a second external light to generate the second reflected light, the second control device receives the second reflected light.

6. The transmission module as claimed in claim 5, further comprising an isolation device disposed between the first and the second reflection devices to prevent the first reflection device from reflecting the second external light and prevent the second reflection device from reflecting the first external light.

7. The transmission module as claimed in claim 5, wherein an external emitter emits the first external light, and the first control device obtains the distance between the external emitter and the transmission module according to the first reflected light.

8. The transmission module as claimed in claim 1, wherein one of the first and the second reflection devices is a mirror or a light guiding plate.

9. The transmission module as claimed in claim 8, wherein the reflectivity of the first reflection device is the same as the reflectivity of the second reflection device or the reflection area of the first reflection device is the same as the reflection area of the second reflection device.

10. The transmission module as claimed in claim 8, wherein the first reflection device comprises a first radian, and the second reflection device comprises a second radian, and the first radian is the same as the second radian.

11. An electronic system comprising:
a transmission module as claimed in claim 1 further comprising:
a third control device receiving a light when the first control device emits the first light and emitting a light when the first control device receives the first reflected light.

* * * * *